No. 796,481. PATENTED AUG. 8, 1905.
G. WEISS.
APPARATUS FOR HUSKING GREEN CORN.
APPLICATION FILED SEPT. 6, 1904.
5 SHEETS—SHEET 2.
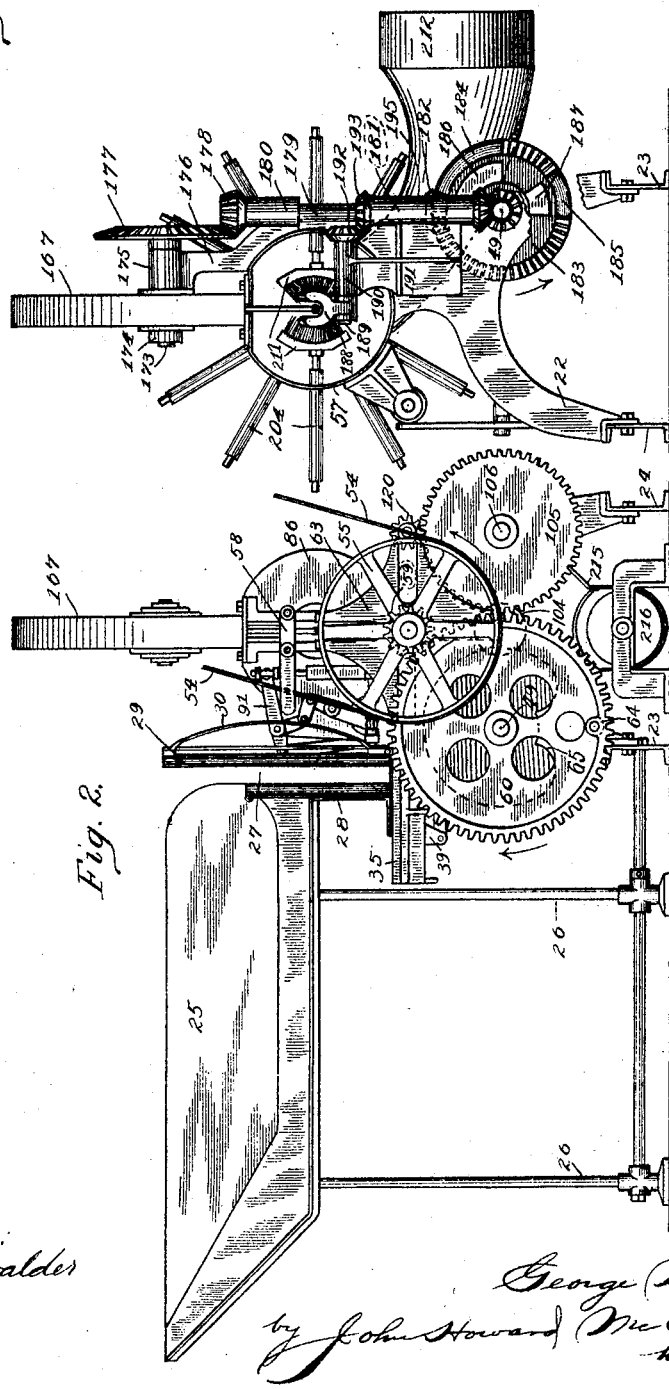
Witnesses:
John Braunwalder
Inventor:
George Weiss,
by John Howard McElroy,
his Att'y.

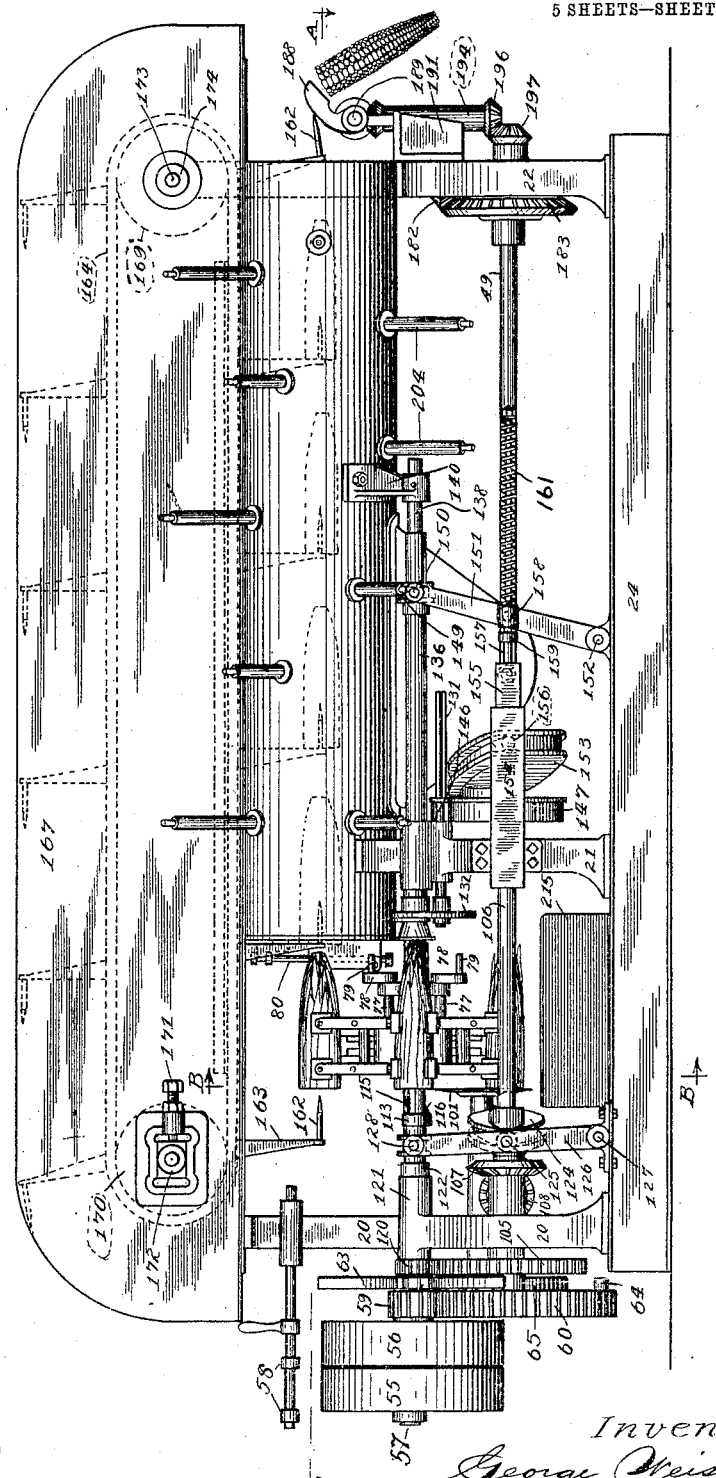

No. 796,481. PATENTED AUG. 8, 1905.
G. WEISS.
APPARATUS FOR HUSKING GREEN CORN.
APPLICATION FILED SEPT. 6, 1904.
5 SHEETS—SHEET 3.
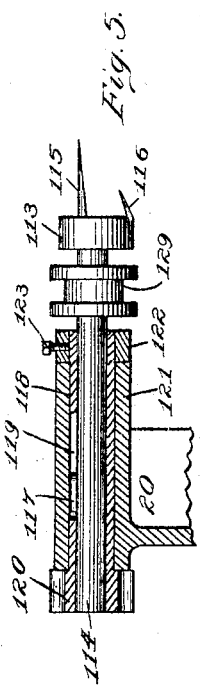
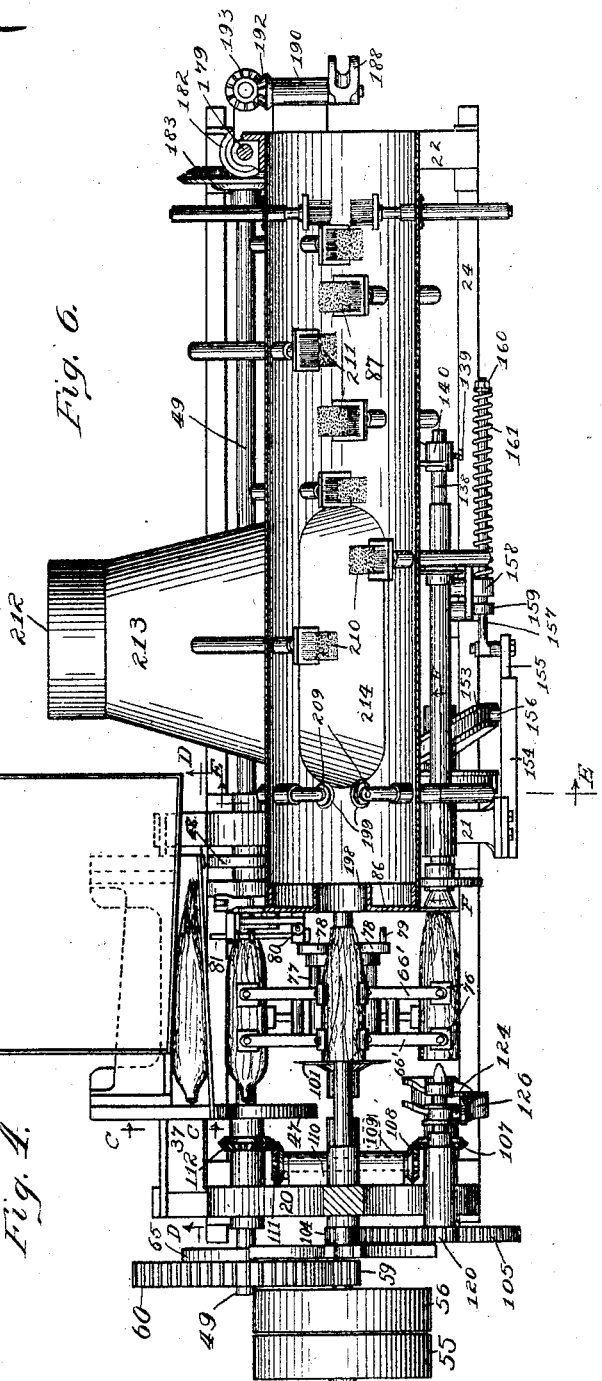
Witnesses:
John Braunwalder
FH Drury
Inventor:
George Weiss,
by John Howard McElroy
his Att'y.

No. 796,481. PATENTED AUG. 8, 1905.
G. WEISS.
APPARATUS FOR HUSKING GREEN CORN.
APPLICATION FILED SEPT. 6, 1904.
5 SHEETS—SHEET 4.
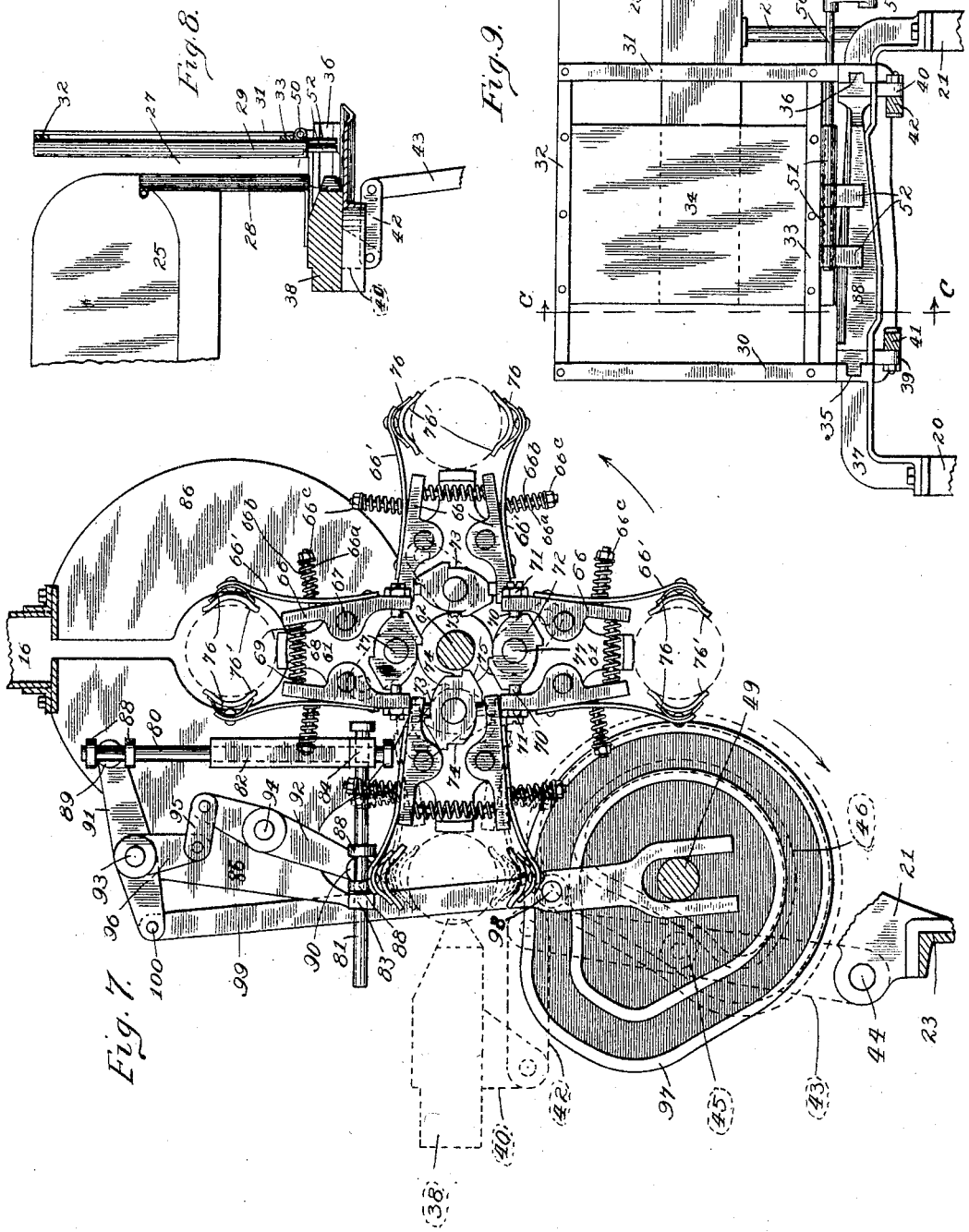
Witnesses:
John Braunwalder
H. Drury
Inventor:
George Weiss
by John Howard McElroy
his Atty.

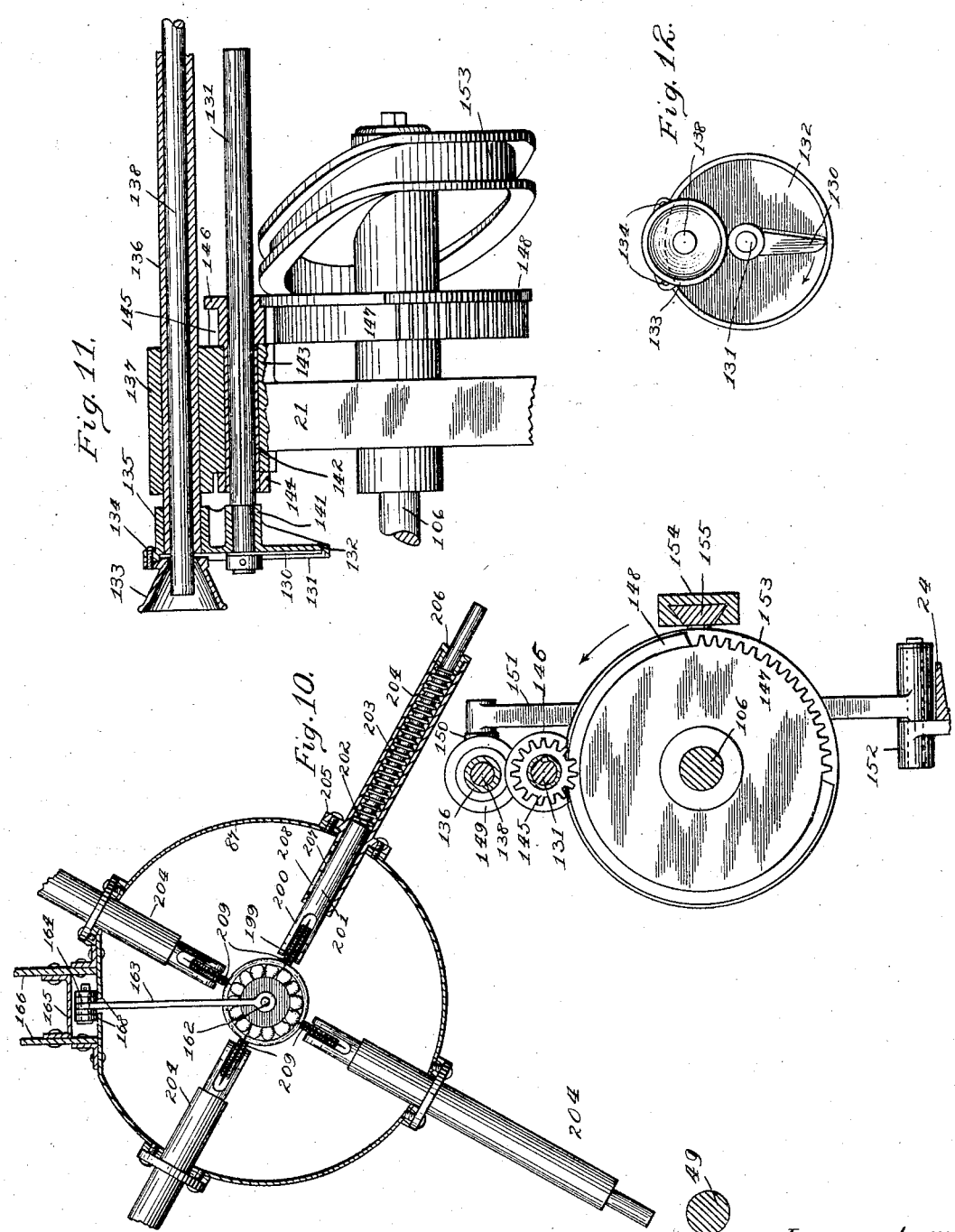

UNITED STATES PATENT OFFICE.

GEORGE WEISS, OF CHICAGO, ILLINOIS.

APPARATUS FOR HUSKING GREEN CORN.

No. 796,481.

Specification of Letters Patent.

Patented Aug. 8, 1905.

Application filed September 6, 1904. Serial No. 223,440.

*To all whom it may concern:*

Be it known that I, GEORGE WEISS, a citizen of the United States, residing at Chicago, Cook county, Illinois, have invented certain new and useful Improvements in Apparatus for Husking Green Corn, of which the following is a specification.

My invention is concerned with a novel apparatus for automatically removing the husks and silk from ears of green Indian corn or maize which have been jerked—*i. e.*, detached—from the stalk without husking it, and is designed to produce a device which shall accomplish automatically what has heretofore ordinarily been done manually.

To illustrate my invention, I annex hereto five sheets of drawings, in which the same reference characters are used to designate identical parts in all the figures, of which—

Figure 1 is a side elevation of the complete apparatus. Fig. 2 is an elevation of the feeding end. Fig. 3 is an elevation of the discharge end. Fig. 4 is a plan view in section on the line A A of Fig. 1. Fig. 5 is a vertical section through the butt-scoring mechanism. Fig. 6 is a vertical section through the butt-trimming mechanism. Fig. 7 is a detail view in section, on an enlarged scale, on the line B B of Fig. 1. Fig. 8 is a detail view of the feeding mechanism in section on the line C C of Fig. 9. Fig. 9 is a front elevation of the mechanism shown in Fig. 8 as seen in section on the line D D of Fig. 4. Fig. 10 is a vertical section, on an enlarged scale, on the line E E of Fig. 4. Fig. 11 is a vertical section, on an enlarged scale, on the line F F of Fig. 4; and Fig. 12 is an end view of the tip-trimming mechanism shown in Fig. 11.

My invention in its complete form consists of, first, feeding apparatus; second, a primary conveyer; third, butt-trimming mechanism; fourth, butt-scoring mechanism; fifth, tip-trimming mechanism; sixth, a secondary conveyer; seventh, husk-slitting knives; eighth, brushes; ninth, an ear-discharger; tenth, a husk-conveyer, and, eleventh, means for automatically operating the foregoing elements in the proper sequence and synchronism. Some of these elements may be omitted without destroying the operativeness of the device; but for perfect work I prefer to employ all of them in the manner illustrated.

The mechanism is mounted on three standards 20, 21, and 22, which are of a suitable shape to support and furnish bearings for the parts and mechanisms to be described, and these brackets are in their turn preferably supported on the channel-beams 23 and 24, which form the base of the apparatus. At one side of the feeding end of the machine I provide a hopper 25, which may be of any suitable shape adapted to receive a quantity of the jerked corn and which I have shown as supported upon the legs 26 and preferably secured rigidly relative to the main mechanism of the machine. At the inner end of the hopper I provide the ear-chute 27, which consists of the vertical plates 28 and 29, which are suitably supported from the bearings 20 and 21 and are slightly divergent, so as to produce a receptacle of the proper size and shape, so that a column of single ears may be placed therein with the tips to the rear, as indicated in Fig. 4. The rear wall 28 may be of a single piece of sheet metal; but the front wall is preferably constructed as best shown in detail in Figs. 2, 8, and 9, where it will be seen to consist of the vertical bars 30 and 31, which are connected by the top and bottom cross-pieces 32 and 33, and the main portion of the front plate 29 consists of the metallic sheet 34, secured to the top and bottom cross-pieces, as clearly shown in Fig. 9. To permit ready access of the hand of the operator to the chute in positioning the ears, the front bar 30 is preferably curved outward, as shown in Fig. 2. The adjacent edge of the plate 34 serves as a gage for positioning the ears, as it marks the line on which the butts will be trimmed, as hereinafter described, so that by positioning them with reference to the gage thus formed the operator will place them in the best possible location to have the ears cleanly husked with the loss of as little of the grain as possible. Sliding in the ways 35 and 36, formed in the bracket 37, is the pusher 38, which, as seen in Fig. 9, is shaped to properly adapt it to push uniformly against the entire length of an average ear of corn. This pusher 38 has the lugs 39 and 40 projecting downwardly therefrom through slots in the casting 37 and having the links 41 and 42 secured thereto and connected to the upper ends of the pair of levers 43, one of which is indicated in dotted lines in Fig. 7, and which have their lower ends suitably pivoted to bearings, as at 44, on the standards 20 and 21. Each of these levers is provided with a lug 45, which preferably takes the form of an antifriction-roller and which projects into the cam-slot 46 of one of the pair of cams 47 and 48, which are secured upon the main driving-shaft 49, which is rotated by suitable mechanism to be described, so that at each revolution of said shaft the pusher 38 will force the lowermost ear into the chute out at one side thereof and deliver it to the primary conveyer to be hereinafter described. To prevent the ears being forced out accidentally at the bottom of the chute by the pressure of the ears above them when the pusher is retracted, I preferably provide the rock-shaft 50, which is journaled in suitable bearings 51, secured to the crosspiece 33. Projecting downward from the rock-shaft in its normal position are the fingers 52, which close the opening leading from the chute temporarily and against the pressure which may be caused by the weight of the ears. To hold the fingers 52 in a vertical position, I may apply a spring to the rock-shaft 50; but I preferably employ the pendant 53, secured to the end thereof, and the weight of which serves to hold the rock-shaft in the desired position.

The shaft 49 is conveniently driven by means of power applied to the belt 54, which coöperates with the driving and idle pulleys 56 and 55, which are loosely mounted upon the bearing stud or shaft 57. A belt-shifter 58 of any desired construction is employed to engage the belt with one or the other of the pulleys, as may be desired. The driving-pulley 56 has secured on the hub thereof the gear-pinion 59, which meshes with the gear-wheel 60, secured upon the shaft 49, so that continuous rotary motion in one direction is imparted to said shaft 49 while the apparatus is running.

The primary conveyer, to which the ears are delivered one by one by the pushing mechanism, consists of a star-shaped supporting member 61, which is rigidly secured upon the shaft 62, which is journaled in suitable bearings in the brackets 20 and 21, and which may be formed integral with the bearing-stud 57, so that the parts 57 and 62 are made up of a single shaft, which rotates in suitable bearings, as described. Adjacent to the pinion 59 I secure to the shaft 62 a Geneva stop star-wheel 63, which is provided with as many radial slots and delay-surfaces as there are sets of clamps upon the primary conveyer—in the form shown four. A pin, which preferably takes the form of an antifriction-roller 64, is secured on the inner face of the gear-wheel 60 in the plane of the slots of the star-wheel 63 and serves to give the star-wheel 63 and the shaft 62 a rotation through ninety degrees during one-fourth of a rotation of the shaft 49, the shaft 62 being locked during the rest of the rotation of the shaft 49 by the action of the delay-surfaces 65 on the wheel 60, coöperating with the delay-surfaces on the star-wheel 63 in the customary and well-known manner.

Referring now especially to Figs. 1, 4, and 7, it will be seen that four sets of clamps are provided upon the primary conveyer, each jaw of the pairs of clamps consisting of the levers 66, pivoted upon the pin 67, the opposing levers being held with two of their ends tending to separate by means of a helically-coiled expanding spring 68, extending between and secured upon the lugs 69, projecting inwardly from the ends of the lever 66. The other ends of said levers are provided with the bearing-pins 70, which are preferably screwed into the desired adjustment and secured there by lock-nuts 71. The inner ends of these pins coöperate with the cam-plates 72, which will be seen to have on their peripheries the two opposed surfaces 73 at short radial distances from the center and the two similarly-opposed surfaces 74 at ninety degrees from the other surfaces, but at a greater radial distance therefrom. These surfaces 73 and 74 are alternately connected by cam-surfaces, the alternating spaces being filled by the lugs 75, which have the shoulders against which the pins 70 abut at the ends of their movement. It will be apparent that when the pins 70 bear against the surfaces 73, as shown at the left hand of Fig. 7, the jaws 76 will be separated by the action of the spring 68, but that when the cam-plates are in position, so that the pins bear against the surfaces 74, the jaws 76 will be held together, as indicated in the other three positions of Fig. 7.

To increase the capacity of the jaws, I employ in connection therewith the extensions 66' of the levers 66. These extensions are preferably flat steel spring-strips and have the jaws 76 riveted to their outer ends. The jaws 76 are preferably faced with rubber, as indicated at 76'. The spring-strips 66' are secured to the part 66 below the pivot 67, and to increase their resilience I preferably employ in connection therewith the helically-coiled expanding springs $66^a$, which surround the pins $66^b$, passing through suitable apertures in the spring-strips and secured in the arms 66. The nuts $66^c$ on the ends of the pins $66^b$ serve to hold the springs $66^a$ in place and to regulate their tension. By the addition of these spring-strips and the coöperating coil-springs I am enabled to provide for ears of all sizes and hold the smaller ones with sufficient firmness, while being able to take care of the large ones.

In the operation of the mechanism it is essential that the jaws 76 be opened when they are opposite the feeding mechanism to receive the ear and that they then be closed and remain closed until they are ready to deliver the ear to the secondary conveyer at the uppermost position, when the jaws must be opened to allow the ear to be carried away by said secondary conveyer. This effect may be produced by providing means to open the jaws in the uppermost position while simultaneously closing them in the left-hand position. For this purpose the mechanism best shown in Figs. 4 and 7 is employed. There are two sets of clamps for each position, and they are pivoted on the opposite sides of the spider or casting 61, and the two cam-plates 72 for each pair of jaws are secured upon rock-shafts 77, which are journaled in the spider 61 and have at their inner ends the arms 78, which are provided with the pins 79, which project into the plane of the vertical and horizontal plungers 80 and 81, which slide in suitable bearings 82, 83, and 84, respectively, which are formed integrally with or rigidly secured to the head 86 of the husking-cylinder 87. The plungers 80 and 81 are provided with the pairs of collars 88, between which are located pins or antifriction-rollers 89 and 90, which are mounted on the outer ends of the levers 91 and 92, which are pivoted on the head 86 at 93 and 94, respectively. A link 95 connects an arm 96, secured to the lever 91, with one arm of the lever 92, so that as the lever 91 is reciprocated the lever 92 will move synchronously therewith. The lever 91 is reciprocated at the proper intervals by means of the cam 97, within whose slot operates the pin or antifriction-roller 98, secured upon the driving-link 99, whose forked inner end is astride the shaft 49 and whose outer end is pivoted, as at 100, to the lever 91.

It will be apparent from the structure described that at a suitable time during the rotation of the shaft 49 the plungers 80 and 81 will be thrown downward and inward, respectively, and that their ends in this movement will contact with the pins 79 of the top and left-hand clamps simultaneously. This action occurs just after the pusher 38 has shoved an ear into position, as indicated by the dotted circle in the left-hand clamp in Fig. 7, to be clamped by the jaws as they are swung together, as indicated by dotted-line position of the jaws at the left hand. In order to remove the husks, it is necessary to trim off the butts immediately adjacent the grains on the ear, and for this purpose I provide the rapidly-rotating circular knife 101, best shown in Fig. 6, (which is secured upon the end of the shaft 102,) which is journaled in the suitably-elongated bearing 103, formed in the standard 20. A gear-pinion 104, secured on the outer end of said shaft, meshes with a constantly-rotating gear-wheel 105, secured upon the outer end of the shaft 106, which is mounted to rotate in suitable bearings in the standards 20 and 21 and which has the miter-gear 107 secured thereon within the standard 20, meshing with the miter-gear 108, secured on the end of the transverse shaft 109, rotating in the bearing 110, formed or secured on the inner face of the standard 20. The other end of the shaft 109 has secured thereon the miter-gear 111, which meshes with the miter-gear 112, secured on the shaft 49, so that the shafts 49 and 106 rotate in unison. As the shaft 102, carrying the rotating circular knife 101, is always rotating and stands in the path of the butt of the ear which is being carried from the left hand to the lowermost position of Fig. 7, it follows that during the first movement of the primary conveyer after receiving the ear the butt thereof is neatly and certainly trimmed off by being carried against the rotating knife 101.

In addition to the trimming of the butt I find that it is advisable to score the end of the ear by means of rotating knives, so as to loosen the husks at one end, so that they will be more readily removed by the stripping mechanism. For this purpose I provide the butt-scoring mechanism illustrated in Figs. 1, 4, and 5. This also consists of rapidly-rotating knives; but these knives are of a different construction from the butt-trimming knife. In Fig. 5 will be seen the knife-disk 113, secured on the end of a shaft 114, which can be reciprocated and rotated by mechanism to be described. The knife 115 projects eccentrically therefrom in the line of the shaft and is intended to be pushed toward the butt while rotating rapidly, so that it will extend into the husks and cut and separate them from the ear. The knife 116, which I also preferably employ, is also located eccentrically and at the periphery of the disk 113 and extends inward at an angle to the axis, so that it has a cutting action on the outer surface of the ends of the husks to loosen them from each other as well as to detach them from the ear. The shaft 114 has a spline 117 thereon, which allows the shaft to be reciprocated longitudinally of the rotating sleeve 118, which has the spline-slot 119 therein and which has the gear-pinion 120 on the end thereof. The sleeve 118 rotates in the bearing 121, formed in the standard 20, and the collar 122, secured by the set-screw 123 to the other end of the sleeve 118, prevents it being displaced by the longitudinal movement of the shaft 114. This pinion 120 meshes with the same gear-wheel 105 that drives the pinion 104. To push the knives forward at each operation to bring them into the plane of the butt after the ear has been brought into position to be scored, I provide the cam 124, which is secured upon the shaft 106. A pin or antifriction-roller 125, secured upon the lever 126 and extending into the groove of the cam 124, serves to reciprocate said lever at each rotation of the shaft, the lever being pivoted at 127 and having the pin or antifriction-roller 128 at its upper end projecting into the peripherally-grooved collar 129, secured on the shaft 114. By means of the mechanism thus shown it will be apparent that at each operation of the machine after the ear, with its trimmed butt, has been brought into the right-hand position the rotating shaft 114, carrying the knives 115 and 116, is brought up against the butt, and the rotation of the knives serves to score the same, as indicated, after which it is withdrawn by the action of the cams before the next step movement is given to the primary conveyer.

At the same time that the butt-scoring action is taking place I preferably trim off the tip to cut off the silk and the tips of the husks, which sometimes become twisted and matted together so that it would be difficult to strip off the husks unless the tips were trimmed. As the ears are of different lengths, the tip-trimming mechanism has to be made so that it will adjust itself automatically to different-sized ears. This mechanism is best illustrated in Figs. 1, 4, 10, 11, and 12. The actual trimming mechanism consists of a knife 130, which is secured on the end of a shaft 131 and rotates over the face of a disk 132, over the upper portion of which projects the conically-shaped holder 133, which is secured to the plate 132, as by the screws 134. (Shown in Figs. 11 and 12.) The plate 132 is rigidly secured, by means of the collar 135, upon the elongated bearing-sleeve 136, which slides in the bearing 137, formed in the standard 21, and upon the stationary bearing-rod 138, the outer end of which is secured by the set-screw 139 in the bearing-bracket 140, projecting from the outer surface of the husking-cylinder 87. It will be apparent that if the sleeve 136 be shoved to the left from the position shown in Fig. 11 to bring the cap 133 over the end of the ear which is in the right-hand position of the primary conveyer and the knife 130 then be given a rotation the tip of the ear which is projecting into the sleeve 136 will be sliced off and that as the sleeve 136 is brought back into its normal position the stationary end of the rod 136 will force the sliced-off tip of the ear out of the sleeve 136 and leave it clean and ready for the trimming of the tip of the next ear. The shaft 131 has a bearing in the disk 132, as at 141, and it is also splined in the rotating sleeve 142, which rotates in the bearing 143, formed in the standard 21 beneath the bearing 137. The sleeve 142 is prevented from movement backward with the shaft 131 by means of the collar 144, secured to the end thereof and contacting with the bearing 143. The other end of the sleeve has rigidly secured thereon the gear-pinion 145, which is provided with the adjacent delay-surface disk 146. The shaft 106 has secured thereon the mutilated gear-wheel 147, which is also provided with the delay-surface 148, coöperating with the delay-surface disk 146, so that during, say, about three-fourths of the rotation of the shaft 106 the coöperating delay-surfaces hold the shaft 131 and the sleeve 142 from rotation, while permitting the longitudinal movement of the shaft. During the remaining portion, which is when the cap 133 is in its advanced position and covering the tip of the ear, the gear-teeth on the mutilated wheel 147 give the shaft 131 a complete rotation and the knife 130 shears off the tip. To throw the sleeve 136 and the shaft 131 and their associated parts forward at the proper time to hold them there and to return them, I provide the peripherally-grooved collar 149, secured upon the sleeve 136, and into the groove projects a pin or antifriction-roller 150, which is secured upon the upper end of the lever 151, which is fulcrumed at 152 to the channel-bar 24. The cam 153 upon the shaft 106 serves to operate the lever 151; but inasmuch as provision must be made for adjusting this tip-trimming mechanism to ears of different size I have to provide special connections between the cam 153 and the lever 151. A dovetailed way 154 is secured to the standard 21 and has sliding therein the bar 155, which carries the pin or antifriction-roller 156, which coöperates with the groove of the cam 153. To the end of the slide-bar 155 I pivot the rod or link 157, which extends through an eye 158, pivoted to the lever 151. A collar 159, secured to the lever 157, normally contacts with the eye 158 and during the backward movement of the parts serves to swing the lever back to its normal position. In order that the movement of the lever may stop when the cap 133 has properly seated itself on the end of a long ear while the slide 155 continues its onward movement, I interpose between the eye 158 and the nut 160 on the rear end of the rod 157 a long soft helically-coiled spring 161, which readily compresses as soon as the further movement of the lever 150 is stopped by reason of the cap 133 being properly seated on the tip of the ear. By means of the mechanism thus described it will be apparent that when the ear has been brought into the right-hand position the tip-trimming mechanism will be brought into the proper position irrespective of the length of the ear and the tip carefully trimmed off and the mechanism then returned, after which the next step movement of the primary conveyer will bring the ear to the top position, where it is to be taken by the secondary conveyer and carried to the husk-stripping cylinder.

The secondary conveyer for carrying the ears through the husking-cylinder 87 preferably takes the form of an endless chain carrying a suitable number of spikes 162, carried by the arms 163, which are located at suitable intervals on the sprocket-chain 164, which is guided during the time that it carries the ears and held from possible buckling by the longitudinal bar 165, secured between the walls 166 of the casing 167, by which the secondary conveyer is preferably incased to prevent the possibility of any accidents. The chain 164 on its lower run rests upon the horizontal ledges 168, formed by the flattened and slotted top of the husking-cylinder 87 and the bottom of the casing 167 beyond the cylinder. The chain 164 is carried by the sprocket-wheels 169 and sprocket, and the sprocket-wheel 170 being secured upon the shaft 171, which is mounted in the adjustable boxes 172, by which slack in the chain may be taken up in the manner clearly indicated. The driving-sprocket 169 is secured upon the shaft 173, journaled in the bearings 174 and 175, which are supported by the bracket 176, forming the uppermost portion of the standard 22. The shaft 173 has secured thereon the bevel gear-wheel 177, which meshes with a bevel gear-pinion 178, secured upon the vertical shaft 179, journaled in the bearings 180 and 181, formed on the standard 22. The lower end of the shaft 179 has secured thereon the bevel gear-pinion 182, which is preferably provided with a delay-surface (not shown) and which is driven by the mutilated gear-wheel 183, which is provided with one set of teeth extending through about one hundred and eighty degrees and another set extending through, say, about sixty degrees, the two sets being separated by the mutilated surface 184, extending over about ninety degrees, and mutilated surface 185, extending over about thirty degrees. The mutilated surfaces 184 and 185 have associated therewith the delay-surfaces 186 and 187 to lock the pinion 182 from possible movement while the secondary conveyer is at rest. This mutilated pinion 183 is secured on the shaft 49. From the construction thus shown it results that with the chain stationary in the position shown in Fig. 1 while the mutilated surface 184 is passing the pinion 182 and the chain is at rest the primary conveyer is being given its movement to bring a fresh ear, with its butt properly trimmed and scored and its tip trimmed, into position. When the shorter-toothed portion engages the pinion 182, the chain is advanced far enough to drive the spike 162 into the end of the cob, so that the butt-end of the ear rests against the arm 163. While the mutilated portion 185 is passing the pinion 182 and the chain is held at rest the action of the plunger 81 opens the clamps holding the uppermost ear, and the larger set of teeth on the pinion 183 now drives the chain forward to carry the ear into the husking-cylinder and to bring another spike into position to operate on the next ear when brought into position by the primary conveyer. The ears are thus carried through the husking-cylinder 87 and finally emerge therefrom with the husks and silk stripped off and are discharged from the spikes by the ear-discharger, which will be seen to consist of a forked arm 188, secured upon the shaft 189, which is journaled in the bearing 190, secured upon the bracket 191, secured upon the standard 22. The shaft 189 has on its other end the miter-gear 192, which meshes with the miter-gear 193, secured upon a vertical shaft 194, rotating in the bearing 195, formed upon the bracket 191. The lower end of the shaft 194 has secured thereon the miter-gear 196, which meshes with the miter-gear 197, secured upon the end of the constantly-rotating shaft 49, so that the gear-discharger 188 is constantly rotated and is so timed that when the husked ear has been brought to the end of the husking-cylinder and stops over the discharger-arm 182 the rotation of the latter, with its yoke embracing the spike 162, forces the ear off, as clearly indicated in Fig. 1.

The husking-cylinder 87 is preferably formed of sheet metal, as shown, and is suitably supported upon and secured to the standards 21 and 22. The head 86 closes that end of the cylinder so much as is possible, while leaving a sufficient aperture 198 to admit the ears. To insure the husks being stripped off, I preferably arrange to slit them longitudinally before bringing the ears to the brushes, and for this purpose I provide adjacent the aperture 198 a set of circular knives 199, which are journaled on their shafts in the yokes 200, formed in the inner ends of the rods 201, which are yieldingly held in their inner position by reason of the shoulders 202 thereof engaging the end of the helically-coiled expansible springs 203, secured in the sleeve 204, each of which is provided with the flange 205, by which it is bolted to the shell 87. A threaded collar 206, screwed into the outer end of the sleeve 204, serves to confine the spring, which thus serves to hold the knife yieldingly, so as to press it against the side of the ear, the various knives being opposed, so that the pressure does not tend to displace the ear or twist the arm 163. A spline 207, coöperating with the slot 208 in the inner end of the sleeve 204, permits the yielding movement of the rod 201, while preventing any rotation thereof which would bring the knives at the wrong angle to the ear to properly slit the husk. To insure the rotation of the knives, and thus improve their action, I preferably secure to the side thereof the disks 209, which have roughened peripheries, which pressing against the husks insure the rotation thereof. After the husks have been slit the ears then pass to the stripping-brushes 210, which are preferably stationary and in that case are mounted on spring-pressed rods similar to those carrying the steel knives. These first brushes are preferably made of stiff steel wire, so that as the ears are drawn past them the husks, which have been loosened at both ends and slitted, will be readily scraped off. From these brushes, which are preferably set in opposed pairs at different angles, the ears pass to the cleaning-brushes 211, which may be of any desired number and arrangement suitable to the corn to be operated upon. I preferably make the brushes adjacent to the steel-wire brushes of very coarse bristles, and these bristles are finer in the brushes nearest the discharge end, so that after the husks have been stripped off and the grains are exposed the softer brushes will wipe off the silk without marring the grains. The husks and silks are forced through the circular pipe-section 212, which is connected to the section 213, which has its inner end somewhat flattened, so as to adapt it to the elongated aperture 214, formed in the bottom of the shell 87 beneath the stripping-brushes. As the aperture 198 is comparatively small and as the other end of the shell is open, if the air is sucked through said aperture it will carry the silk from the outer end into the discharge-aperture 214, into which the bulk of the husks falls by gravity, so that the husks and silk will be readily taken care of and discharged from the apparatus.

Beneath the primary conveyer to catch the butts and tips which are trimmed off I preferably locate the receptacle 215, which may be provided with the customary screw conveyer 216.

While I have shown and described my invention as embodied in the form which I at present consider best adapted to carry out its purposes, it will be understood that it is capable of wide modifications, both in the design and arrangement and combination of the elements, and that I do not desire to be limited in the interpretation of the following claims, except as may be necessitated by the state of the prior art.

What I claim as new, and desire to secure by Letters Patent of the United States, is—

1. In a device of the class described, the combination with an intermittently-operated step-by-step conveyer, of a butt-trimming apparatus coöperating therewith, an automatically-adjustable mechanism to trim the tips of the ears coöperating with the ear when the conveyer is at rest, and means for automatically removing the husks from the trimmed ears.

2. In a device of the class described, the combination with the frame, of the butt-trimming and the automatically-adjustable tip-trimming mechanisms mounted therein, the brushes carried thereby, conveying mechanism carrying members adapted to hold the individual ears rigidly and carry them to the trimming mechanisms and brushes to be operated on thereby, and means for automatically operating the foregoing elements in the proper sequence and synchronism, for the purpose described.

3. The combination with an intermittently-operated step-by-step conveyer, of butt-trimming apparatus coöperating therewith, an automatically-adjustable mechanism to trim the tips of the ears coöperating therewith when the conveyer is at rest and comprising a spring-pressed cap moved upon the tip of the ear and a knife moving across the cap, and means for removing the husks from the trimmed ears.

4. In a device of the class described, the combination with the frame, of the butt trimming and scoring and tip-trimming mechanisms mounted therein, the brushes carried thereby, conveying mechanism carrying members adapted to hold the individual ears rigidly and carry them to the trimming and scoring mechanisms and brushes to be operated on thereby, and means for operating the foregoing elements in the proper sequence and synchronism, for the purpose described.

5. In a device of the class described, the combination with the frame, of the butt-trimming mechanism and the husk-slitting knives mounted therein, the brushes carried thereby, conveying mechanism carrying members adapted to hold the individual ears rigidly and carry them to the trimming mechanism, slitting-knives and brushes, to be operated on thereby, and means for operating the foregoing elements in the proper sequence and synchronism, for the purpose described.

6. In a device of the class described, the combination with the frame, of the butt and tip trimming mechanisms and the husk-slitting knives mounted therein, the brushes carried thereby, conveying mechanism carrying members adapted to hold the individual ears rigidly and carry them to the trimming mechanisms, knives and brushes to be operated on thereby, and means for operating the foregoing elements in the proper sequence and synchronism, for the purpose described.

7. In a device of the class described, the combination with the frame, of the butt trimming and scoring mechanisms and the slitting-knives mounted therein, the brushes carried thereby, conveying mechanism carrying members adapted to hold the individual ears rigidly and carry them to the trimming and scoring mechanisms, knives and brushes to be operated on thereby, and means for operating the foregoing elements in their proper sequence and synchronism, for the purpose described.

8. In a device of the class described, the combination with the frame, of the butt and tip trimming and the butt-scoring mechanisms and the husk-slitting knives mounted therein, the brushes carried thereby, conveying mechanism carrying members adapted to hold the individual ears rigidly and carry them to the trimming and scoring mechanisms, knives and brushes, to be operated on thereby, and means for operating the foregoing elements in the proper sequence and synchronism, for the purpose described.

9. In a device of the class described, the combination of the frame, with the butt-trimming mechanism mounted therein, the brushes carried thereby, conveying mechanism carrying members adapted to hold the individual ears rigidly and carry them to the trimming mechanism and brushes to be operated on thereby, feeding apparatus for delivering the ears one by one to said members, and means for operating the foregoing elements in the proper sequence and synchronism, for the purpose described.

10. In a device of the class described, the combination of the frame, with the butt and tip trimming mechanisms mounted therein, the brushes carried thereby, conveying mechanism carrying members adapted to hold the individual ears rigidly and carry them to the trimming mechanisms and brushes to be operated on thereby, feeding apparatus for delivering the ears one by one to said members, and means for operating the foregoing elements in the proper sequence and synchronism, for the purpose described.

11. In a device of the class described, the combination with the frame, of the butt trimming and scoring mechanisms mounted therein and the brushes carried thereby, conveying mechanism carrying members adapted to hold the individual ears rigidly and carry them to the trimming and scoring mechanisms and brushes to be operated on thereby, feeding apparatus for delivering the ears one by one to said members, and means for operating the foregoing elements in the proper sequence and synchronism, for the purpose described.

12. In a device of the class described, the combination with the frame, of the butt and tip trimming and the butt-scoring mechanisms mounted therein, the brushes carried thereby, conveying mechanism carrying members adapted to hold the individual ears rigidly and carry them to the trimming and scoring mechanisms and the brushes, to be operated on thereby, feeding apparatus for delivering the ears one by one to said members, and means for operating the foregoing elements in the proper sequence and synchronism, for the purpose described.

13. In a device of the class described, the combination with the frame, of the butt-trimming mechanism and the husk-slitting knives mounted therein, the brushes carried thereby, conveying mechanism carrying members adapted to hold the individual ears rigidly and carry them to the trimming mechanism and knives and brushes, to be operated on thereby, feeding apparatus for delivering ears one by one to said members, and means for operating the foregoing elements in the proper sequence and synchronism, for the purpose described.

14. In a device of the class described, the combination with the frame, of the butt and tip trimming mechanisms and the husk-slitting knives mounted therein, the brushes carried thereby, conveying mechanism carrying members adapted to hold the individual ears rigidly and carry them to the trimming mechanisms, knives and brushes, to be operated on thereby, feeding apparatus for delivering the ears one by one to said members, and means for operating the foregoing elements in the proper sequence and synchronism, for the purpose described.

15. In a device of the class described, the combination with the frame, of the butt trimming and scoring mechanisms and the slitting-knives mounted therein and the brushes carried thereby, conveying mechanism carrying members adapted to hold the individual ears rigidly and carry them to the trimming and scoring mechanisms, knives and brushes, to be operated on thereby, feeding apparatus for delivering ears one by one to said members, and means for operating the foregoing elements in their proper sequence and synchronism, for the purpose described.

16. In a device of the class described, the combination with the frame, of the butt and tip trimming and the butt-scoring mechanisms, and the husk-slitting knives mounted therein and the brushes carried thereby, conveying mechanism carrying members adapted to hold the individual ears rigidly and carry them to the trimming and scoring mechanisms, knives and brushes, to be operated on thereby, and means for operating the foregoing elements in the proper sequence and synchronism, for the purpose described.

17. In a device of the class described, the combination with the frame, of the butt-trimming mechanism mounted therein and the brushes carried thereby, the primary conveyer adapted to carry individual ears to the butt-trimming mechanism to be operated on thereby, the secondary conveyer carrying members adapted to hold the individual ears rigidly and carry them past the brushes, to be operated on thereby, and means for operating the foregoing elements in the proper sequence and synchronism, for the purpose described.

18. In a device of the class described, the combination with the frame, of the butt trimming and scoring mechanisms mounted therein and the brushes carried thereby, the primary conveyer adapted to carry the ears individually to the butt trimming and scoring mechanisms to be operated on thereby, the secondary conveyer carrying members adapted to hold the individual ears rigidly and carry them past the brushes, to be operated on thereby, and means for operating the foregoing elements in their proper sequence and synchronism, for the purpose described.

19. In a device of the class described, the combination with the frame, of the butt and tip trimming and the butt-scoring mechanisms mounted therein and the brushes carried thereby, the primary conveyer adapted to carry the ears individually to the trimming and scoring mechanisms to be operated on thereby, the secondary conveyer carrying members adapted to hold the individual ears rigidly and carry them past the brushes, to be operated on thereby, and means for operating the foregoing elements in their proper sequence and synchronism, for the purpose described.

20. In a device of the class described, the combination with the frame, of the butt-trimming mechanism and the husk-slitting knives mounted therein and the brushes carried thereby, the primary conveyer adapted to carry the ears individually to the butt-trimming mechanism to be operated on thereby, the secondary conveyer carrying members adapted to hold the individual ears rigidly and carry them past the knives and brushes, to be operated on thereby, and means for operating the foregoing elements in their proper sequence and synchronism, for the purpose described.

21. In a device of the class described, the combination with the frame, of the butt and tip trimming mechanisms and the husk-slitting knives mounted therein, and the brushes carried thereby, the primary conveyer adapted to carry the ears individually to the trimming mechanisms to be operated on thereby, the secondary conveyer carrying members adapted to hold the individual ears rigidly and carry them past the brushes and knives to be operated on thereby, and means for operating the foregoing elements in their proper sequence and synchronism, for the purpose described.

22. In a device of the class described, the combination with the frame, of the butt trimming and scoring mechanisms and the husk-slitting knives mounted therein, and the brushes carried thereby, the primary conveyer adapted to carry the ears individually to the butt trimming and scoring mechanisms, to be operated on thereby, the secondary conveyer carrying members adapted to hold the individual ears rigidly and carry them past the knives and brushes, to be operated on thereby, and means for operating the foregoing elements in their proper sequence and synchronism, for the purpose described.

23. In a device of the class described, the combination with the frame, of the butt and tip trimming and butt-scoring mechanisms, and the husk-slitting knives mounted therein and the brushes carried thereby, of the primary conveyer adapted to carry the ears individually to the trimming and scoring mechanisms, to be operated on thereby, the secondary conveyer carrying members adapted to hold the individual ears rigidly and carry them past the knives and brushes to be operated on thereby, and means for operating the foregoing elements in their proper sequence and synchronism, for the purpose described.

24. In a device of the class described, the combination with the frame, of the butt and tip trimming and the butt-scoring mechanisms, and the husk-slitting knives mounted therein and the brushes carried thereby, the primary conveyer adapted to carry individual ears to the trimming and scoring mechanisms to be operated on thereby, feeding apparatus to deliver the ears one by one to the primary conveyer, the secondary conveyer carrying members adapted to hold the individual ears rigidly and carry them past the knives and brushes to be operated on thereby, and means for operating the foregoing elements in their proper sequence and synchronism, for the purpose described.

25. In a device of the class described, the combination with the frame, of the butt-trimming mechanism mounted therein and the brushes carried thereby, the primary conveyer adapted to carry individual ears to the butt-trimming mechanism to be operated on thereby, the secondary conveyer carrying members adapted to carry the ears past the brushes to be operated on thereby, a movable discharger for releasing the ears from the secondary conveyer, and means for operating the foregoing elements in the proper sequence and synchronism, for the purpose described.

26. In a device of the class described, the combination with the frame, of the butt and tip trimming mechanisms mounted therein and the brushes carried thereby, the primary conveyer adapted to carry individual ears to the butt and tip trimming mechanisms to be operated on thereby, the secondary conveyer carrying members adapted to carry the ears past the brushes to be operated on thereby, the movable ear-discharger for releasing the ears from the secondary conveyer, and means for operating the foregoing elements in the proper sequence and synchronism, for the purpose described.

27. In a device of the class described, the combination with the frame, of the butt-trimming and scoring mechanisms mounted therein and the brushes carried thereby, the primary conveyer adapted to carry the ears individually to the butt trimming and scoring mechanisms to be operated on thereby, the secondary conveyer carrying members adapted to carry the ears past the brushes to be operated on thereby, the ear-discharger for releasing the ears from the secondary conveyer, and means for operating the foregoing elements in their proper sequence and synchronism, for the purpose described.

28. In a device of the class described, the combination with the frame, of the butt and tip trimming and the butt-scoring mechanisms mounted therein, and the brushes carried thereby, the primary conveyer adapted to carry the ears individually to the trimming and scoring mechanisms to be operated on thereby, the secondary conveyer carrying members adapted to carry the ears past the brushes to be operated on thereby, the ear-discharger for releasing the ears from the secondary conveyer, and means for operating the foregoing elements in their proper sequence and synchronism, for the purpose described.

29. In a device of the class described, the combination with the frame, of the butt-trimming mechanism and the husk-slitting knives mounted therein and the brushes carried thereby, the primary conveyer adapted to carry the ears individually to the butt-trimming mechanism to be operated on thereby, the secondary conveyer carrying members adapted to carry the individual ears past the knives and brushes to be operated on thereby, the ear-discharger for releasing the ears from the secondary conveyer, and means for operating the foregoing elements in their proper sequence and synchronism, for the purpose described.

30. In a device of the class described, the combination with the frame, of the butt and tip trimming mechanism and the husk-slitting knives mounted therein and the brushes carried thereby, the primary conveyer adapted to carry the ears individually to the trimming mechanisms to be operated on thereby, the secondary conveyer carrying members adapted to carry the individual ears past the knives and brushes to be operated on thereby, the ear-discharger for releasing the ears from the secondary conveyer, and means for operating the foregoing elements in their proper sequence and synchronism, for the purpose described.

31. In a device of the class described, the combination with the frame, of the butt trimming and scoring mechanisms and the husk-slitting knives mounted therein and the brushes carried thereby, the primary conveyer adapted to carry the ears individually to the butt trimming and scoring mechanisms to be operated on thereby, the secondary conveyer carrying members adapted to carry the individual ears past the knives and the brushes to be operated on thereby, the ear-discharger for releasing the ears from the secondary conveyer, and means for operating the foregoing elements in the proper sequence and synchronism, for the purpose described.

32. In a device of the class described, the combination with the frame, of the butt and tip trimming and butt-scoring mechanisms and the husk-slitting knives mounted therein and the brushes carried thereby, of the primary conveyer adapted to carry the ears individually to the trimming and scoring mechanisms to be operated on thereby, the secondary conveyer carrying members adapted to carry the ears past the knives and brushes to be operated thereby, the ear-discharger for releasing the ears from the secondary conveyer, and means for operating the foregoing elements in their proper sequence and synchronism, for the purpose described.

33. In a device of the class described, the combination with the frame, of the butt-trimming mechanism and the brushes carried thereby, conveying mechanism carrying members adapted to present the individual ears to the butt-trimming mechanism and the brushes to be operated on thereby, the feeding apparatus comprising a vertical chute adapted to hold a single column of ears, and mechanism for delivering the ears one at a time from said chute to the conveying apparatus, and means for operating the foregoing elements in the proper sequence and synchronism, for the purpose described.

34. In a device of the class described, the combination with the conveying apparatus, of the butt-trimming mechanism and the brushes; of the feeding mechanism comprising a vertical chute adapted to hold a single column of ears, a pusher coöperating with one end of the chute to deliver the ears one by one to the conveying apparatus, and mechanism for holding the ear opposite the pusher in place until it is positively forced out by said pusher; and means for operating the foregoing elements in the proper sequence and synchronism, for the purpose described.

35. In a device of the class described, the combination with the conveying apparatus, the butt-trimming mechanism and the brushes; of the feeding apparatus comprising a vertical chute adapted to hold a single column of ears, a pusher coöperating with one end of the chute to deliver the ears one by one to the conveying apparatus; pivoted vertical fingers coöperating with the lowermost ears for holding it in place until it is positively forced out by the pusher; and means for operating the foregoing elements in the proper sequence and synchronism, for the purpose described.

36. In a device of the class described, the combination with the conveying apparatus, the butt-trimming mechanism, and the brushes; of the feeding apparatus comprising a vertical chute adapted to hold a single column of ears, a pusher coöperating with one end of the chute to force the ears one by one into the conveyer, a horizontally-weighted rock-shaft pivoted adjacent the delivery end of the chute, and fingers secured to said rock-shaft and operating to hold the ear opposite the pusher in place until it is positively forced out thereby; and means for operating the foregoing elements in the proper sequence and synchronism, for the purpose described.

37. In a device of the class described, the combination with the butt-trimming mechanism, of the step-by-step conveyer for the ears, consisting of the pairs of clamping members, a common support therefor, means for moving the support automatically step by step, means for automatically opening and closing the clamping members at the proper time and mechanism for positively forcing an ear of corn into the jaw of each pair of clamping members just prior to its closing.

38. In a device of the class described, the combination with the butt-trimming mechanism, of the step-by-step conveyer for the ears, consisting of the pairs of clamping members, a common support therefor, means for moving the support automatically step by step, means for automatically opening and closing the clamping members at the proper time consisting of the cams adapted to coöperate with the clamping members, means for moving said cams and mechanism for positively forcing an ear of corn into the jaw of each pair of clamping members just prior to its closing.

39. In a device of the class described, a primary conveyer comprising the pairs of clamping-jaws, a common support therefor, means for advancing the support automatically step by step, the cams interposed between the clamping-jaws, the rock-shafts carrying the same, the arms on the rock-shaft, the push-rods coöperating with the arms, and means to reciprocate the push-rods at proper intervals.

40. In a device of the class described, a primary conveyer comprising pairs of clamping-jaws, a common support therefor, means for advancing the support automatically step by step, the cams interposed between the clamping-jaws, the rock-shafts carrying the cams, the arms on the rock-shafts, the push-rods coöperating with the arms, means to reciprocate the push-rods at proper intervals consisting of the driving-shaft, the cam thereon, the link operated by the cam, and the system of levers connecting the link to the pushers.

41. In a device of the class described, a clamp consisting of two rigid pivoted members, means for controlling the relative positions of said members, the jaws, and the spring-strips connecting the jaws with the rigid members.

42. In a device of the class described, a clamp consisting of two rigid pivoted members, means for controlling the relative positions of said members, the jaws, the spring-strips connecting the jaws with the rigid members, and the coil-springs reinforcing the resiliency of the strips.

43. In a device of the class described, a clamp consisting of two rigid pivoted members, means for controlling the relative positions thereof, the jaws, the spring-strips connecting the jaws with the rigid members to which they are secured below the pivots, the pins above the pivots projecting through apertures in the strips, and the helically-coiled expanding springs surrounding the pins and holding the strips against the rigid members.

44. In a device of the class described, the clamps, each consisting of two rigid pivoted members, the jaws carried by said pivoted members, springs tending to hold the jaws separated, and the cams having two stop-faces, at different radial distances, coöperating directly with the rigid pivoted members, for the purpose described.

45. In a device of the class described, the combination with an intermittently-operated step-by-step conveyer, of butt-trimming apparatus coöperating therewith, a cap, a knife moving across the cap, yielding means for moving the cap over the tip of the ear, means for moving the knife across the cap when over the ear, and means for automatically removing the husks from the trimmed ears.

46. In a device of the class described, the combination with the intermittently-operated, step-by-step conveying apparatus and members carried thereby for holding the individual ears rigidly therein, of a rapidly-rotating knife against which the ears are carried transversely by the conveying apparatus to shear off the butts, and the brushes past which the ear is then carried to brush off the husks.

47. In a device of the class described, the combination with the intermittently-operated, step-by-step primary conveyer and members carried thereby for holding the individual ears rigidly therein, of a rapidly-rotating knife against which the ears are carried transversely to shear off the butts, the secondary conveyer to which the ears are then delivered, and the brushes past which the ear is then carried by the secondary conveyer to brush off the husks.

48. In a device of the class described, a butt-scoring apparatus consisting of a rotating shaft having an eccentrically-mounted blade extending along the direction of the axis thereof, means for advancing the shaft to bring the knife into the plane of the butt, and means for rotating the shaft.

49. In a device of the class described, a butt-scoring apparatus consisting of a rotating shaft having a blade extending along the axis thereof, at its end, another blade extending at an acute angle to the first blade, means for advancing the shaft to bring the knives into the plane of the butt, and means for rotating the shaft.

50. In a device of the class described, the combination with the intermittently-operated step-by-step conveyer, of butt-trimming apparatus coöperating therewith, a cap adapted to be moved over the tip of an ear in one position of the conveyer, a knife adapted to be swung across the cap when over the tip of the ear, a sliding bearing for said cap, actuating mechanism for the cap, yielding spring connections between the cap and the actuating mechanisms, means for automatically swinging the knife in any position of the cap, and means for automatically removing the husks from the trimmed ears.

51. In a device of the class described, a butt-scoring apparatus consisting of a rotating shaft having an eccentrically-mounted knife-blade extending from the end thereof, a cam for reciprocating said shaft at proper intervals, and means for rotating the shaft.

52. In a device of the class described, a butt-scoring apparatus, consisting of a rotating shaft having an eccentrically-mounted knife-blade extending from the end thereof, means for reciprocating the shaft, consisting of a cam, a lever swung thereby, a collar on the shaft engaged by the end of the lever, and means for rotating the shaft.

53. In a device of the class described, a butt-scoring apparatus, consisting of a rotating shaft splined in the sleeve, and having an eccentrically-mounted blade projecting from the end thereof, a pinion secured on said sleeve, a collar on the shaft, a driving-shaft having a gear-wheel meshing with the pinion, a cam on the driving-shaft, and a lever reciprocated by the cam and having its free end engaging with the collar.

54. In a device of the class described, the combination with the conveyer, of the cap adapted to receive only the tip of the ear, and a knife-blade moving across one end of said cap to shear off the tip.

55. In a device of the class described, the combination with the conveyer, of the cap adapted to fit over only the tip of the ear, and a knife-blade moving across one end of said cap to shear off the tip.

56. In a device of the class described, the combination with the conveyer for the ears, of the cap mounted on the sliding support and adapted to fit over the tip of an ear, yielding driving connections for sliding said support, and a knife moving across one end of said cap to shear off the tip of the ear.

57. In a device of the class described, the combination with the conveyer for the ears, of the cap mounted on a sliding support, a cam-actuated sliding bar, a lever connected to the cam and to the sliding support, and a spring-pressed yielding connection between the support and the lever.

58. In a device of the class described, the combination with the conveyer, of the cap adapted to fit over the tip of the ear, the sleeve 136 supporting the cap, the lever 151, the pivoted collar 158 thereon, the sliding cam-actuated bar 155, the link 157 pivoted to said bar and passing through the collar 158, the spring 161 interposed between the end of the rod 157 and the knife 158, the knife coöperating with the cap to shear off the tip, and means for rotating the knife.

59. In a device of the class described, the combination with the conveyer, of the cap 133, the sliding sleeve 136 upon which the cap is mounted, the stationary rod 138 upon which the sleeve slides, means for reciprocating said sleeve, the knife 130 swinging across one end of the cap, and means for swinging the knife when the cap is in one position.

60. In a device of the class described, the combination with the conveyer, of the cap 133, the sliding sleeve 136 upon which the cap is mounted, the stationary rod 138 upon which the sleeve slides, means for reciprocating said sleeve, the knife 130 swinging across one end of the cap, means for swinging the knife when the cap is in one position, consisting of the spline upon which the knife is secured, the sleeve into which the shaft rotates, the gear-pinion on said sleeve, and the mutilated gear-wheel coöperating with the pinion.

61. In a device of the class described, the combination with the step-by-step primary conveyer, of the cap 133, the sleeve 136, the stationary rod 138, the shaft 131, the sleeve 142 into which the shaft is splined, the knife 130 secured on the end of the shaft 131, the bearing-bracket connecting the sleeve 136 and the shaft 131, the shaft 106, the mutilated gear-wheel 147 secured on the shaft, the gear-pinion 145 meshing therewith, secured on the sleeve 142, the cam 153 secured on the shaft 106, the lever 151 having its upper end connected with the sleeve 136 to reciprocate the latter as the lever is swung, and yielding connections between the lever and the cam 153.

62. In a device of the class described, the combination with the step-by-step primary conveyer, of the cap 133, the sleeve 136, the stationary rod 138, the shaft 131, the sleeve 142 into which the shaft is splined, the knife 130 secured on the end of the shaft 131, the bearing-bracket connecting the sleeve 136 and the shaft 131, the shaft 106, the mutilated gear-wheel 147 secured on the shaft, the gear-pinion 145 meshing therewith, secured on the sleeve 142, the cam 153 secured on the shaft 106, the lever 151 having its upper end connected with the sleeve 136 to reciprocate the latter as the lever is swung, the slide-bar 155 having the pin coöperating with the cam, the rod 157 pivoted to the slide-bar, the collar 158 pivoted to the lever 151, and through which the rod 157 passes, and the helically-coiled expanding spring 155 surrounding the rod 157 and secured between its end and the collar 158.

63. In a device of the class described, the combination with the primary conveyer, of the butt-trimming mechanism, and the secondary conveyer consisting of a sprocket-chain moving in suitable guides, the arms thereon, and the horizontal pins carried by the arms and adapted to penetrate the ends of the cobs while the ears are held by the primary conveyer.

64. In a device of the class described, the combination with the primary conveyer, of the butt-trimming mechanism and the secondary conveyer consisting of a sprocket-chain moving in suitable guides, the arms thereon, horizontal pins carried by the arms and adapted to penetrate the ends of the cobs while the ears are held by the primary conveyer, and means for advancing the conveyers alternately.

65. In a device of the class described, the combination with the primary conveyer, of the butt-trimming mechanism, the step-by-step secondary conveyer having the pins adapted to penetrate the ends of the cobs while the ears are held by the primary conveyer, and means for advancing the primary conveyer to bring an ear into position for the secondary conveyer, for advancing the secondary conveyer for inserting the pin, for releasing the hold of the primary conveyer on the ear, and for advancing the secondary conveyer.

66. In a device of the class described, the combination with the alternately-operating primary and secondary conveyers, of mechanism for advancing the primary conveyer to bring an ear into the path of the secondary conveyer, then advancing the secondary conveyer to take hold of the ear, and then advancing the secondary conveyer to carry the ear away from the primary conveyer.

67. In a device of the class described, the combination with the step-by-step primary conveyer having the clamps for holding the ears, with the secondary conveyer having the pins adapted to penetrate the ends of the ears, the butt-trimming mechanism coöperating with the ears when in the primary conveyer, and means for moving the primary conveyer to bring an ear into the path of the secondary conveyer, and then advancing the secondary conveyer to cause a pin to enter the ear, then releasing the clamps of the primary conveyer, and then advancing the secondary conveyer to carry the ear away from the primary conveyer.

68. In a device of the class described, the combination with the step-by-step primary conveyer, of the butt-trimming mechanism coöperating therewith, the step-by-step secondary conveyer including the constantly-driven shaft carrying the gear-wheel having the two mutilated portions thereof coöperating with a gear-pinion driving the conveyer.

69. In a device of the class described, the combination with the step-by-step primary conveyer, of the butt-trimming mechanism coöperating therewith, and the step-by-step secondary conveyer consisting of the sprocket-chain moving in suitable guides and carrying the pins adapted to penetrate the ends of the cobs, the driving mechanism for the primary conveyer, consisting of the constantly-rotating shaft, the intermittently-rotating shaft of the primary conveyer, and the Geneva-stop mechanism interposed between said shafts.

70. In a device of the class described, the combination with the step-by-step primary conveyer, of the step-by-step secondary conveyer, the intermittently-driven shaft of the primary conveyer provided with a Geneva-stop disk, the intermittently-driven shaft of the secondary conveyer provided with a gear-pinion, the main driving-shaft, the Geneva-stop-driving member connected therewith, coöperating with the stop-disk on the primary conveyer-shaft, and the mutilated gear-wheel coöperating with the gear-pinion on the secondary conveyer-shaft.

71. In a device of the class described, the combination with an intermittently-operated step-by-step conveyer, of butt-trimming apparatus coöperating therewith, the rod 138 supported in suitable bearings, the sleeve 136 sliding thereon, the cap carried by the end of the sleeve, the splined shaft 131, the gear carried thereby, the knife secured on the end of the shaft coöperating with the cap, yielding driving connections for moving the sleeve 136 to carry the cap over the tip of the ear, and a gear-wheel meshing with the pinion on the shaft.

72. In a device of the class described, the combination with the conveyer, of the rotary husk-slitting knives having the disks secured thereto provided with the roughened peripheries.

73. In a device of the class described, the combination with the conveyer, of the sleeves extending radially to the axis thereof, the rods carrying the knives sliding in said sleeves, and the helically-coiled expanding springs in the sleeves tending to hold the knives in engagement with the ears.

74. In a device of the class described, the combination with the conveyer, of the rotary husk-slitting knives having disks with roughened peripheries secured thereto, and springs for holding the knives in engagement with the ears as they are carried past them by the conveyer.

75. In a device of the class described, the combination with the conveying apparatus and members carried thereby adapted to hold the ear rigidly throughout its travel, of the butt-trimming mechanism, and the spring-pressed brushes disposed along the line of travel of the ears beyond the butt-trimming mechanism.

76. In a device of the class described, the combination with the conveying apparatus and members carried thereby adapted to hold the ear rigidly throughout its travel, of the butt-trimming mechanism coöperating therewith, and the spring-pressed brushes of varying stiffness disposed in the line of travel of the ears.

77. In a device of the class described, the combination with the conveying apparatus and members carried thereby adapted to hold the ear rigidly throughout its travel, of the butt-trimming mechanism, and the spring-pressed steel-wire brushes disposed along the line of movement of the ears to brush off the husks.

78. In a device of the class described, the combination with the conveying apparatus and members carried thereby adapted to hold the ear rigidly throughout its travel, of the butt-trimming mechanism, the spring-pressed steel brushes disposed along the line of travel of the ears adjacent the butt-trimming mechanism, and the bristle brushes similarly disposed beyond the steel brushes.

79. In a device of the class described, the combination with the conveying apparatus and members carried thereby adapted to hold the ear rigidly throughout its travel, of the butt-trimming mechanism, the husk-slitting knives, and the spring-pressed brushes disposed along the line of travel of the ears beyond the knives.

80. In a device of the class described, the combination of the conveying apparatus and members carried thereby adapted to hold the ear rigidly throughout its travel, with the butt-trimming mechanism, and the spring-pressed brushes disposed along the line of travel of the ears and grouped radially at different angles.

82. In a device of the class described, the combination with the primary conveyer, of the butt-trimming mechanism, the secondary conveyer consisting of the sprocket-chain moving in suitable guides and having the arms thereon provided with horizontal pins adapted to penetrate the ends of the cobs, and the ear-discharger adapted to remove the ears from the pins.

82. In a device of the class described, the combination with the primary conveyer of the butt-trimming mechanism, the secondary conveyer consisting of the sprocket-chain moving in suitable guides and having the arms thereon provided with horizontal pins adapted to penetrate the ends of the cobs, and the ear-discharger adapted to remove the ears from the pins, consisting of the rotating yoke-shaped piece timed to strike the butt of the ear when it is adjacent thereto.

In witness whereof I have hereunto set my hand this 3d day of September, 1904.

GEORGE WEISS.

Witnesses:
JOHN H. McELROY,
G. Y. DANKWARD.